March 30, 1965    MASAYUKI MATSUI    3,175,640

MUFFLING DEVICES FOR AIR HANDLING SYSTEMS

Filed April 10, 1962

INVENTOR.
Masayuki Matsui
BY
Stevens, Davis, Miller & Mosher
Attorneys

3,175,640
MUFFLING DEVICES FOR AIR HANDLING SYSTEMS

Masayuki Matsui, Meguro-ku, Tokyo, Japan, assignor to Fukuo Saeki, Fujisawa-shi, Kanagawa-ken, Japan
Filed Apr. 10, 1962, Ser. No. 186,402
Claims priority, application Japan, Apr. 19, 1961, 36/13,988
7 Claims. (Cl. 181—55)

Recently the air supply system of air conditioning systems in buildings has adopted a high speed and high pressure mechanism, which brings about increased frictional noise in air duct pipe added to the noise of the blower. So it is hardly possible to absorb sound as desired by means of common silencing apparatus hitherto used and there are many cases where the muffler itself produces frictional noise. As a countermeasure of such inconvenience the use of a larger muffler is indicated. However since such means lowers the air pressure, the air pressure must be increased resulting in an increased equipment cost and moreover being accompanied by the above undesirable effect of frictional noise of the muffler itself. So it is well known that the appropriate noise absorption cannot be obtained by means of conventional mufflers.

In view of these facts, contrary to a conventional muffler with a noise absorbing portion provided on the circumferential surface of air duct pipe, the present invention is characterized by a flexible porous screen backed by a rigid porous plate extended in the interior of the noise absorbing portion, coinciding the inner surface with that of air duct pipe, and a mitigation zone between the flexible porous screen and the sound absorbing portion is provided.

The invention will now be described further by way of example, with reference to the accompanying drawings, in which:

FIGS. 1 and 2, FIGS. 3 and 4 and FIGS. 5 and 6 respectively show in longitudinal section and in cross section different embodiments of this invention.

FIGS. 1 to 4 show the embodiments of the present invention applied to hitherto called lining duct type.

Figure 1:
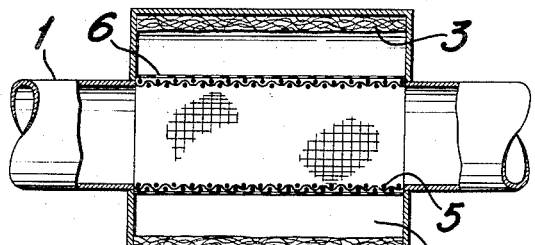
Figure 2:
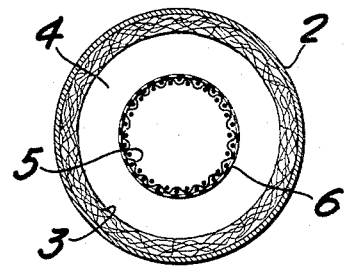

In the embodiment of FIGS. 1 and 2 the air duct pipe 1 is enlarged in a specific portion 2. Inside the circumferential wall of this enlarged portion is provided a sound absorbing layer 3, which is composed of glass-wool or other sound absorbing materials, inwardly forming mitigation zone 4, and equal in diameter to the inner diameter of air duct 1 is a flexible porous screen 5 of glass-fabric or the like which serves as a guide for the air flow. That is, the screen 5 serves as a barrier which maintains the straight air flow and prevents it from deflecting or following a curved path through the mitigation chamber 4. Since the screen 5 is porous, air may of course force its way through it; however, the screen prevents a smooth flow of air into and out of the chamber 4. In other words, any air which tends to pass through the screen 5 and into the chamber 4 would be trapped in chamber 4 since the screen 5 inhibits the air from freely and smoothly flowing into and out of the chamber 4. On the other hand, the porosity of the screen 5 does not inhibit the transmission of sound waves therethrough. More particularly said screen is tightly backed with wire screen or other rigid reinforcing perforated material 6.

Figure 3:
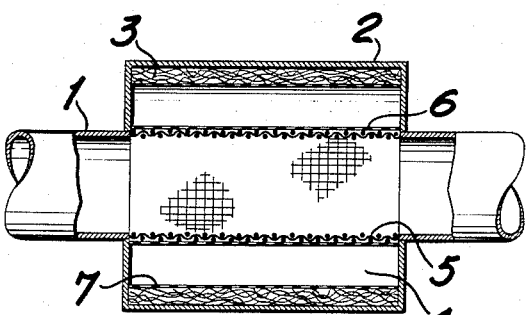
Figure 4:
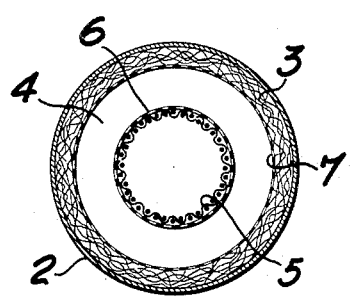
Figure 5:
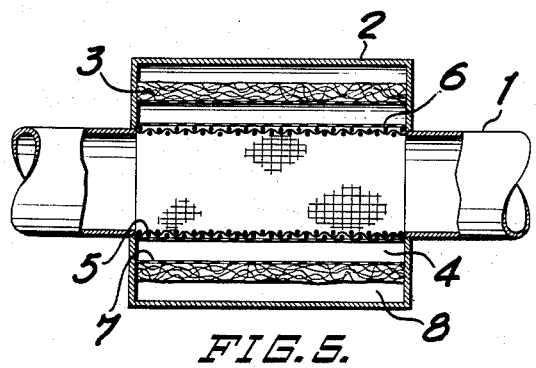
Figure 6:
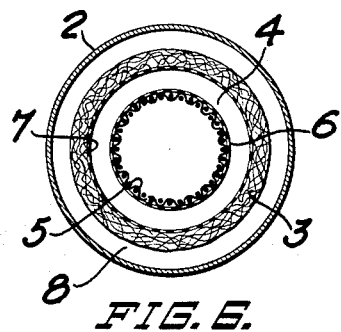

FIGS. 3 and 4 and FIGS. 5 and 6 respectively show the embodiments of the present invention applied to hitherto called resonator type. The embodiment shown in FIGS. 3 and 4 is similar to that of FIGS. 1 and 2 in construction in that a flexible porous screen 5 backed with rigid reinforcing material 6 which does not prevent the permeation of sound wave is extended in the enlarged portion 2 in diameter coinciding to the inner diameter of air duct pipe 1 and, in the outside thereof, the sound absorbing layer 3 is provided outside of mitigation zone 4. Especially along the inside surface of sound absorbing layer 3 there is provided perforated plate 7 appropriated to absorb sound wave. The one shown in FIGS. 5 and 6 represents an air layer 8 provided around the sound absorbing layer 3 of FIGS. 3 and 4.

In accordance with the present invention, in the enlarged portion of air duct pipe is a porous screen, backed with rigid porous reinforcing material and with a final sound absorbing layer therearound at the outside of the mitigation zone. This screen not only restrains the noise from being produced by the turbulence of supplied air and prevents pressure loss, but propagates the permeating sound wave into the sound absorbing layer, mitigating it through a circumferential void zone. In short the effective muffling action which makes this invention especially suitable to muffle the sound wave of specific frequency in high speed air ducts is dependent upon the flexible porous screen which does not disturb the air flow but rather maintains it in the same cross-sectional shape and area which it has as it emerges from the duct 1, while at the same time said screen permits the transmission of sound waves therethrough and into the mitigation chamber 4.

It is to be understood that the embodiments disclosed herein are merely illustrative of the invention and that many other embodiments may be contemplated which will fall within the spirit and scope of the invention.

What I claim is:

1. A muffling system for high velocity gas flow, comprising inlet and outlet ducts having a particular cross-sectional configuration and a muffling device connected to and between said ducts, said device comprising an inner wall which defines a conduit having a cross section which corresponds to the cross-section of said inlet and outlet ducts, said device also comprising an outer wall which defines a hollow chamber surrounding said conduit, said inner wall being flexible and perforated, a layer of sound-absorbent material defining a hollow chamber surrounding said conduit, said inner wall being flexible to an extent whereby said inner wall is adapted to pass sound waves therethrough and flexible enough so as not to create any sound waves induced by turbulence in said gas flow.

2. The system of claim 1 wherein said inner wall is made of glass fabric.

3. The system of claim 2, wherein said glass fabric is reinforced by a wire screen backing.

4. The system of claim 1, wherein said outer wall defines a hollow chamber surrounding said layer of sound-absorbent material.

5. The system of claim 4, wherein said layer comprises a perforated plate facing said conduit.

6. The system of claim 1, wherein said layer is adjacent said outer wall.

7. The system of claim 6, wherein said layer comprises a perforated plate facing said conduit.

References Cited by the Examiner

UNITED STATES PATENTS 2,326,612   8/43   Bourne _____ 181—48

FOREIGN PATENTS

| 1,093,725 | 11/54 | France. |
| 1,158,817 | 2/58 | France. |
| 351,565 | 6/31 | Great Britain. |
| 379,563 | 9/32 | Great Britain. |
| 841,828 | 7/60 | Great Britain. |
| 350,031 | 7/37 | Italy. |

LEO SMILOW, *Primary Examiner.*

C. W. ROBINSON, *Examiner.*